(12) United States Patent
Nagasaka

(10) Patent No.: US 8,482,824 B2
(45) Date of Patent: Jul. 9, 2013

(54) IMAGE READING APPARATUS

(75) Inventor: Hideaki Nagasaka, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 544 days.

(21) Appl. No.: 12/725,340

(22) Filed: Mar. 16, 2010

(65) Prior Publication Data

US 2010/0245953 A1    Sep. 30, 2010

(30) Foreign Application Priority Data

Mar. 30, 2009  (JP) .................................. 2009-082205

(51) Int. Cl.
*H04N 1/46*    (2006.01)

(52) U.S. Cl.
USPC ............................ 358/509; 358/505; 358/484

(58) Field of Classification Search
None
See application file for complete search history.

(56) References Cited

U.S. PATENT DOCUMENTS

| | | | |
|---|---|---|---|
| 6,545,777 B1 | 4/2003 | Amimoto | |
| 6,785,026 B1 | 8/2004 | Terajima et al. | |
| 6,967,605 B2 * | 11/2005 | Fujihara et al. ................ | 341/139 |
| 7,884,978 B2 * | 2/2011 | Ikeno et al. .................... | 358/509 |
| 2005/0024246 A1 | 2/2005 | Fujihara et al. | |
| 2007/0165288 A1 | 7/2007 | Ikeno et al. | |
| 2009/0116080 A1 * | 5/2009 | Maruyama ..................... | 358/475 |

FOREIGN PATENT DOCUMENTS

| | | |
|---|---|---|
| JP | H06-062184 A | 3/1994 |
| JP | H07-143285 A | 6/1995 |
| JP | H10-126576 A | 5/1998 |
| JP | H11-298673 A | 10/1999 |
| JP | 2000-013564 A | 1/2000 |
| JP | 2000-316067 A | 11/2000 |
| JP | 2005-051566 A | 2/2005 |
| JP | 2007-194817 A | 8/2007 |

OTHER PUBLICATIONS

Japan Patent Office, Notification of Reason for Refusal for Japanese Patent Application No. 2010-077054 (counterpart Japanese patent application), dispatched Jan. 8, 2013.

* cited by examiner

*Primary Examiner* — Cheukfan Lee

(74) *Attorney, Agent, or Firm* — Baker Botts L.L.P.

(57) ABSTRACT

An image reading apparatus includes: a sheet table including a placement surface on which a sheet is placed; a light emitting device including light sources; a light emitting unit including a plurality of light emitting devices for emitting light to the placement surface; a light receiving unit; a read image conversion unit converting the received light into read image information; a pulse signal output unit that outputs a pulse signal; a plurality of drive current supply units supplying drive currents to the plurality of light emitting devices; a light emission control unit; a first light emission parameter determination unit; and a second light emission parameter determination unit. The light emission control unit controls the light sources to emit the same color light in sequence based on a drive current value of a first and second light emitting devices and a light emission time of the light sources.

6 Claims, 12 Drawing Sheets

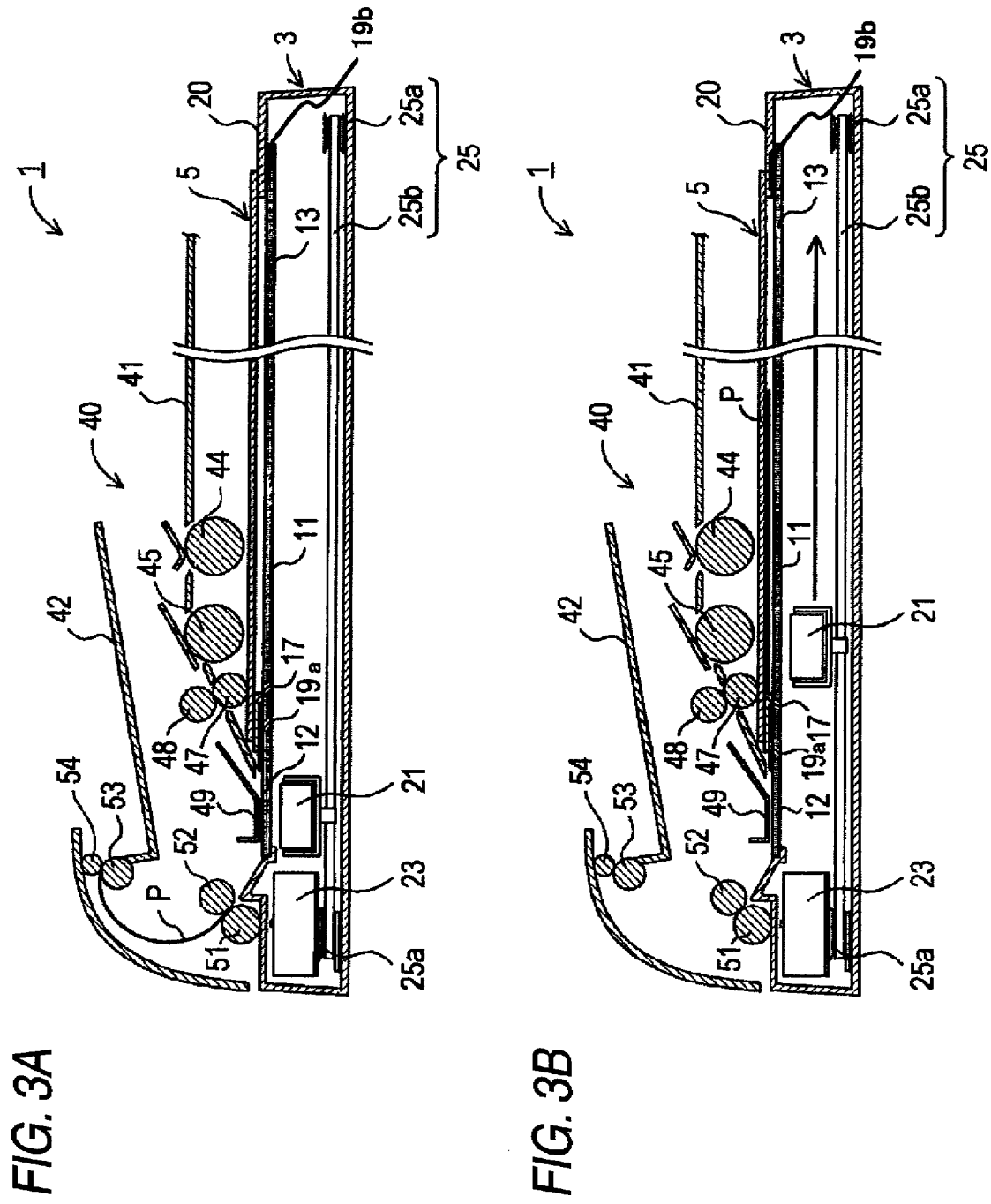

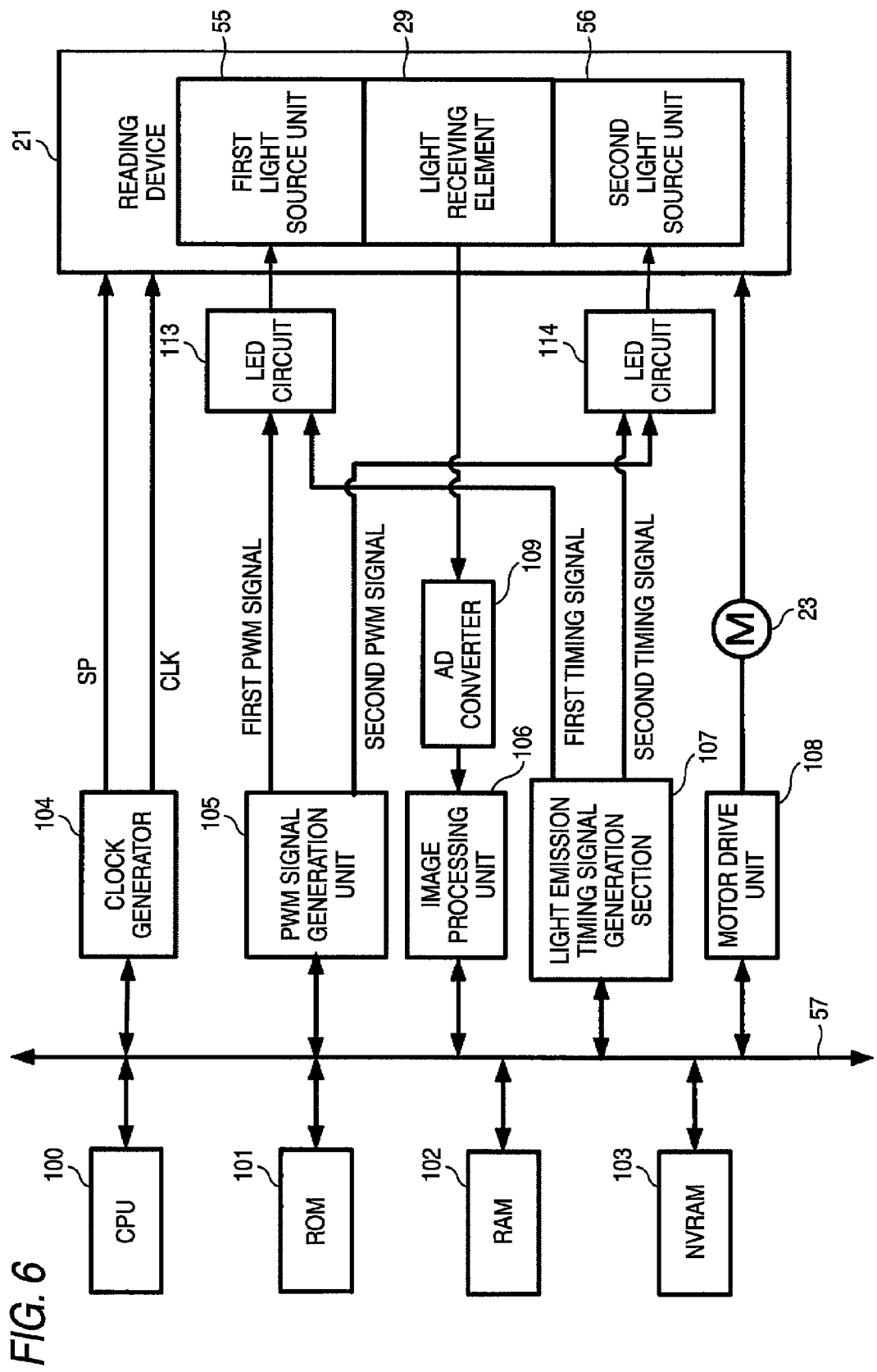

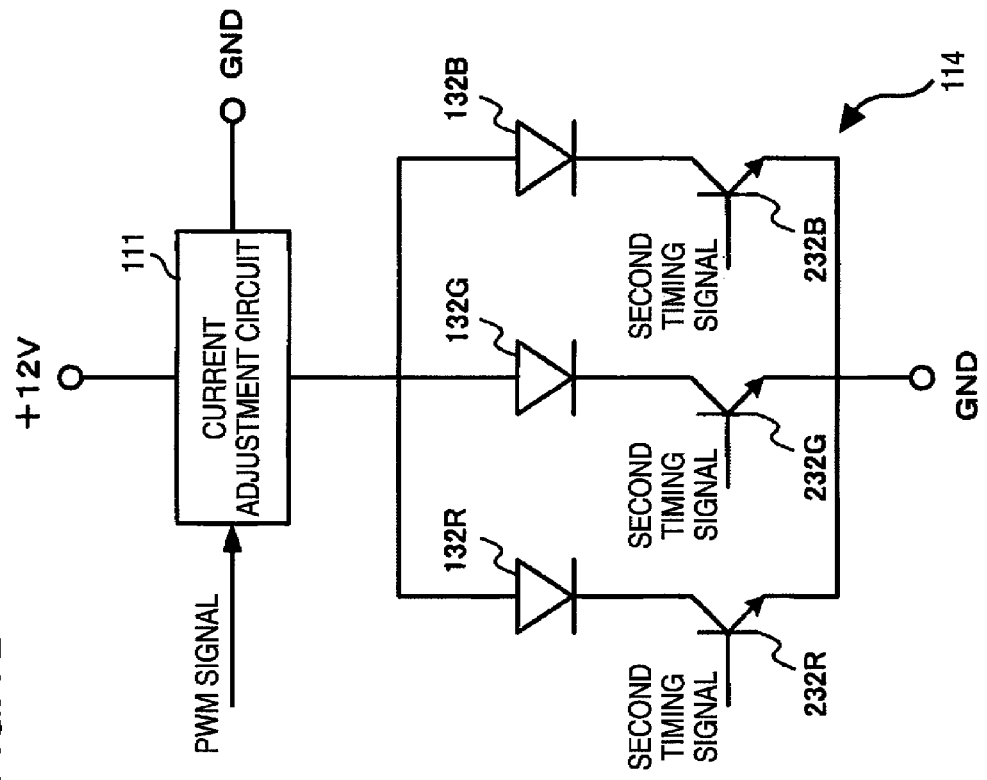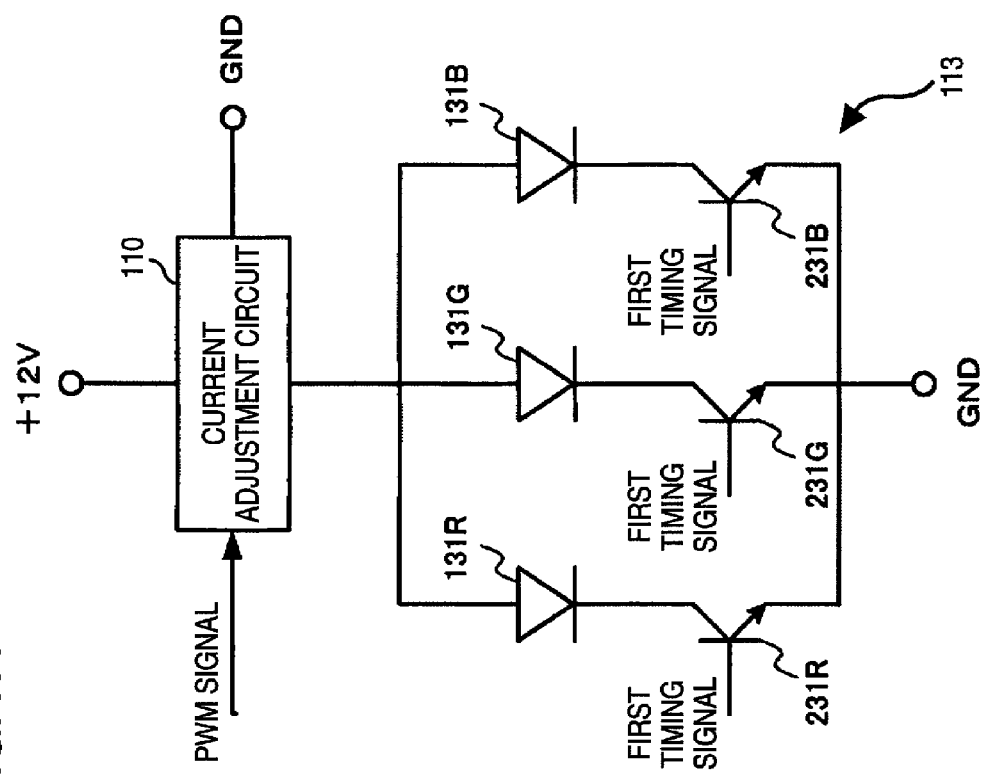

IMAGE READING APPARATUS

CROSS-REFERENCE TO RELATED APPLICATIONS

This application claims priority from Japanese Patent Application No. 2009-82205 filed on Mar. 30, 2009, the entire subject matter of which is incorporated herein by reference.

TECHNICAL FIELD

This invention relates to an image reading apparatus that emits light to a sheet for reading an image on the sheet.

BACKGROUND

There has been proposed a known color image reading apparatus including an LED capable of emitting three primary colors of R (red), G (green) and B (blue). The known color image reading apparatus emits R light, G light and B light by the LED to a sheet in sequence and reads the sheet. To simplify control an R-light source, G-light source and B-light source of the LED, the known color image reading apparatus sets current values of the R-light source, G-light source and B-light source to the same and adjusts emission times of the R light, G light and B light individually to appropriate values for setting light amount in reading the sheet.

One known image reading apparatus, which includes a pair of LEDs, adjusts a light emission time of one LED based on an end of a light emission period of one line cycle and adjusts a light emission time of the other LED based on a start of the light emission period of one line cycle in order to shorten a time period where the light is not emitted to a sheet.

Another known image reading apparatus includes a plurality of light source units for emitting light to a sheet in order to increase amount of light reflected from the sheet.

SUMMARY

Illustrative aspects of the invention provide an image reading apparatus including a plurality of light source units, each of which includes a plurality of light sources having different emission colors, for emitting light to a sheet.

BRIEF DESCRIPTION OF THE DRAWINGS

Illustrative aspects of the invention will be described in detail with reference to the following figures wherein:

FIGS. 3A and 3B are schematic sectional views, taken along a length direction, of the image reading apparatus;

FIG. 6 is a block diagram showing an electric configuration of the image reading apparatus;

FIGS. 7A and 7B are circuit diagrams showing an electric configuration of an LED circuit and LED chips shown in FIG. 6;

DETAILED DESCRIPTION

General Overview

Figure 1A:
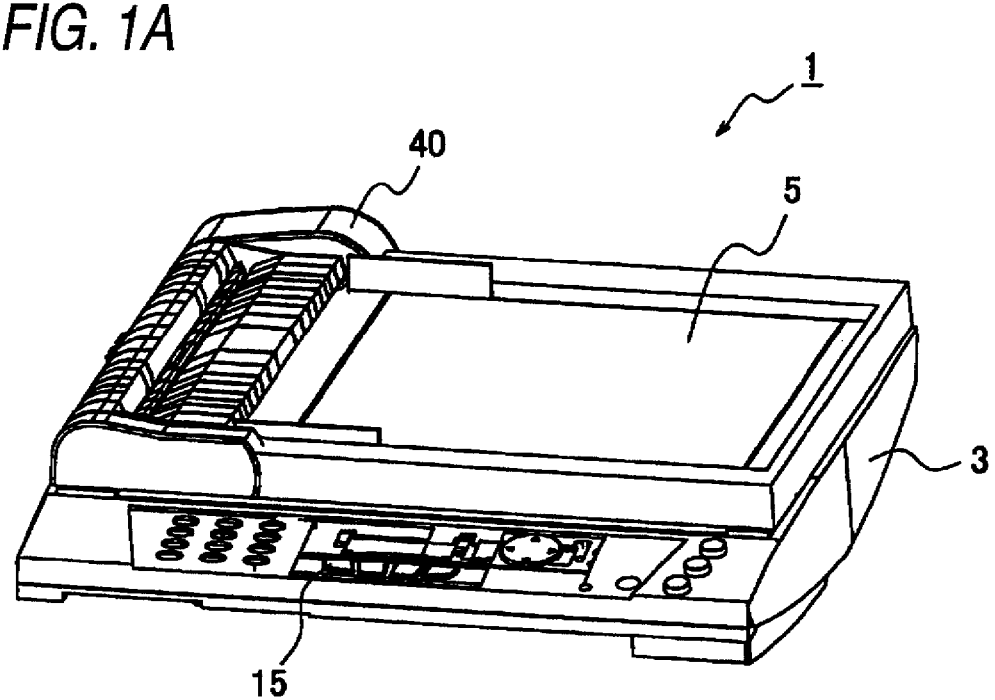
FIGS. 1A and 1B are schematic views of an image reading apparatus according to the invention.

Illustrative aspects of the invention provide an image reading apparatus including a plurality of light source units, each of which includes a plurality of light sources having different emission colors, for emitting light to a sheet in order to decrease a read error of a horizontal thin line on the sheet and an occurrence of interference fringe (moire), etc.

According to a first illustrative aspect of the invention, there is provided an image reading apparatus comprising: a sheet table comprising a placement surface on which a sheet is placed; a light emitting device comprising a plurality of light sources, each of which emits different color light from one another; a light emitting unit, which comprises a plurality of light emitting devices, and which emits light to the placement surface; a light receiving unit that receives reflected light from the placement surface; a read image conversion unit that converts the reflected light into read image information; a pulse signal output unit that outputs a pulse signal of a period corresponding to a time for converting into the read image information of one line as a minimum unit for converting into the read image information by the read image conversion unit from the reflected light of each of the plurality of light sources; a plurality of drive current supply units that supply drive currents, each of which is a constant current, to respective one of the plurality of light emitting devices; a light emission control unit that is configured to: control the light sources to emit the same color lights among the plurality of light emitting devices for each period, switch the light sources from emitting first color lights by first color light sources to emitting second color lights by second color light sources among the plurality of light emitting devices for each period in sequence in synchronization with the pulse signal; and control the second color light sources to emit the second color lights based on a current value determined for each of the plurality of light emitting devices and a light emission time for each of the plurality of light sources during the period; a first light emission parameter determination unit that is configured to: select a smallest light source, in which a light amount required for converting into the read image information is the smallest among the plurality of light sources, from the plurality of light sources; control the smallest light source to emit light throughout the period; determine the current value required for obtaining at least the required light amount based on the emit light by the smallest light source; determine the determined current value as the drive current value of a first light emitting device having the smallest light source; and determine the light emission time of each of the plurality of light sources of the first light emitting device for enabling each of the plurality of light sources of the first light emitting device to emit the light throughout the period; and a second light emission parameter determination unit that determines a drive current value of a second light emitting device and the light emission time of each of the plurality of light sources of the second light emitting device such that a sum of a first light amount and a second light amount becomes the light amount required for converting into the read image information during the period, wherein: the first light amount is a light amount of light emitted from each of the plurality of light sources of the first light emitting device in the drive current value determined by the first light emission parameter determination unit; and the second light amount is a light amount of light, which is emitted from the light source of the second light emitting device and which is the same color as the light emitted from each of the plurality of light sources of the first light emitting device, received by the light receiving unit, wherein the light emission control unit controls the plurality of light sources to emit the same color light in sequence based on the drive current value of each of the first light emitting device and the second light emitting device and the light emission time of each of the plurality of light sources determined by the first light emission parameter determination unit and the second light emission parameter determination unit.

The image reading apparatus switches the light sources of the same color of the light source units for each time taken for converting read image information of one line as the minimum unit for converting the read image information (hereinafter, one-line period) in sequence in synchronization with the pulse signal and the switched light source emits light based on the current value determined for each of the light source units and the light emission time for each of the light sources to emit light during the period. At the time, the image reading apparatus of the first aspect of the invention does not involve any interval where light becomes extinct because each of the light sources making up one of the light source units emits light throughout the one-line period.

According to a second illustrative aspect of the invention, in the image reading apparatus, wherein the first light emission parameter determination unit comprises: a first light source control unit that controls each of the plurality of light sources of the first light emitting device to emit light throughout the period; and a first current value adjustment unit that adjusts the current value for each of the plurality of light sources of the first light emitting device so as the light amount of reflected light received by the light receiving unit to become the light amount required for converting into the read image information when the first light source control unit controls the plurality of light sources of the first light emitting device to emit light, and wherein the first light emission parameter determination unit determines a current value of a minimum light source, which current value is the minimum among the current values of the plurality of light sources adjusted by the first current value adjustment unit, as the drive current value of the first light emitting device.

In the image reading apparatus, first, one of the light source units is caused to emit light throughout the one-line period for each light source. The image reading apparatus of the second aspect of the invention adjusts the current value for each of the light sources of the light source unit so that the light amount becomes the light amount required for converting the read image. It is determined that the current value of the light source with the minimum current value among the light sources of the light source unit is the current value for driving the light source unit.

According to a third illustrative aspect of the invention, in the image reading apparatus, wherein the light emitting unit comprises the first light emitting device and the second light emitting device, wherein the second light emission parameter determination unit sets the light emission time of a first light source of the second light emitting device, which emits the same color light as that of the smallest light source, to zero, and wherein the second light emission parameter determination unit comprises: a second light source control unit that controls one light source of the first light emitting device and one light source of the second light emitting device, which emits the same color light as that of the first light source, throughout the period using the current value determined by the first light emission parameter determination unit; a second current value adjustment unit which, based on light emission of the second light source control unit, adjusts current values of other light sources than the first light source of the second light emitting device such that a sum of a light amount of one of the plurality of light sources of the first light emitting device and a light amount of one of the plurality of light sources of the second light emitting device received by the light receiving unit becomes the light amount required for converting into the read image information; a second current determination unit that determines a maximum light source, which current value is the maximum among the current values of the other light sources of the second light emitting device adjusted by the second current value adjustment unit, as the drive current value of the second light emitting device; and a second light emission time determination unit, which determines a light emission time of the maximum light source to emit light throughout the period, and which determines a light emission time of remaining light source of the second light emitting device such that a sum of the a light amount of the remaining one light source and a light amount of one light source, which emits the same color light as that of the remaining one light source, of the first light emitting device becomes the light amount required for converting into the read image information.

According to a fourth illustrative aspect of the invention, there is provided an illuminator for use with image reading apparatus, the illuminator comprising: a first light emitting unit for emitting first light; a second light emitting unit for emitting second light; a pulse signal generator that generates a pulse signal at constant interval; and a controller that is coupled to: the first light emitting unit; the second light emitting unit; and the pulse signal generator, wherein the controller is configured to control the first light emitting unit to: start emitting the first light upon receipt of a first pulse signal from the pulse signal generator; and stop emitting the first light upon receipt of a second pulse signal from the pulse signal generator, and wherein the controller is configured to control the second light emitting unit to: start emitting the second light after the controller controls the first light emitting unit to start emitting the first light; and stop emitting the second light before the controller controls the first light emitting unit to stop emitting the first light.

According to a fifth illustrative aspect of the invention, in the illuminator, wherein the first light emitting unit comprises: a first red light source for emitting first red light; a first green light source for emitting first green light; and a first blue light source for emitting first blue light, wherein the second light emitting unit comprises: a second red light source for emitting second red light; a second green light source for emitting second green light; and a second blue light source for emitting second blue light, and wherein the controller controls the second light emitting unit to: emit the second red light when the first light emitting unit is emitting the first red light; emit the second green light when the first light emitting unit is emitting the first green light; and emit the second blue light when the first light emitting unit is emitting the first blue light.

According to a sixth illustrative aspect of the invention, in the illuminator, wherein the controller controls light intensity of the first light emitting unit and light intensity and emission time of the second light emitting unit such that a sum of a first light amount of the first light emitting unit and a second light amount of the second light emitting unit becomes a predetermined value, wherein the first light amount is obtained by multiplying the light intensity of the first light emitting unit by one constant interval of the pulse signal, the one constant interval corresponding to emission time of the first light emitting unit, and wherein the second light amount is obtained by multiplying the light intensity of the second light emitting unit by the emission time of the second light emitting unit.

According to the first illustrative aspect of the invention, the image reading apparatus does not involve any interval where light becomes extinct and thus makes it possible to decrease the causes of a read failure of a horizontal thin line of a sheet, occurrence of interference fringe (moire), etc.

According to the second illustrative aspect of the invention, although the characteristic of each of the light sources changes due to variation with time, the image reading apparatus can cope with the characteristic change of each of the light sources caused by variation with time by adjusting the current value of each of the light sources of one of the light source units, and can determine appropriately that the current value of the light source with the minimum current value is the current value for driving the light source unit.

According to the third illustrative aspect of the invention, in the image reading apparatus, the light source of at least either of the first light source unit and the second light source unit continues to emit light without being extinct throughout the one-line time and the required light amount can be reliably obtained from both the light sources, so that the sheet can be read uniformly.

Exemplary Embodiments

Exemplary embodiments of the invention will now be described with reference to the drawings.

(Image Reading Apparatus)

Figure 1B:
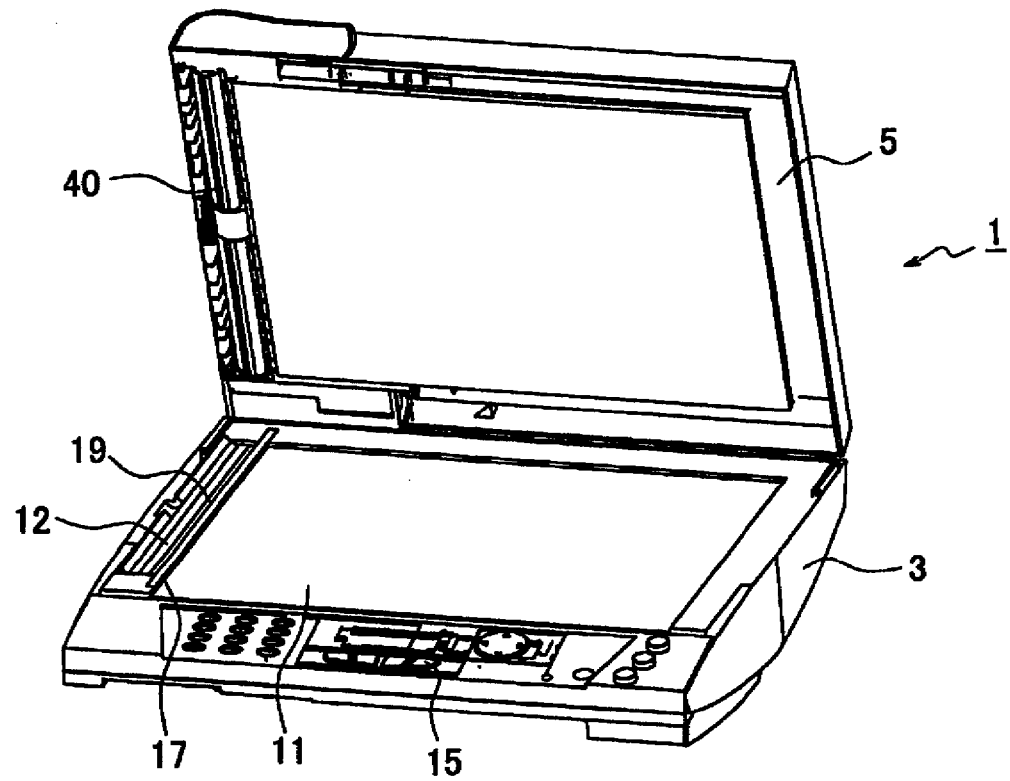

Referring to FIGS. 1A and 1B, an image reading apparatus 1 includes a main body 3 and an FB cover 5 that is provided above the main body. The main body 3 includes a first read surface 11 and a second read surface 12 on the top thereof. The FB cover 5 is openable and closeable with respect to the main body 3. Incidentally, a flatbed scanner is one example of the image reading apparatus 1.

As shown in FIG. 1A, the FB cover 5 covers a top face of the main body 3 when the FB cover 5 is closed. FIG. 1A is an external view of the image reading apparatus 1 showing a state in which the FB cover 5 is closed, and FIG. 1B is another external view of the image reading apparatus 1 showing a state in which the FB cover 5 opened. As shown in FIGS. 1A and 1B, the FB cover 5 is openable and closable about an axis in the left-right direction in FIGS. 1A and 1B.

Figure 2:
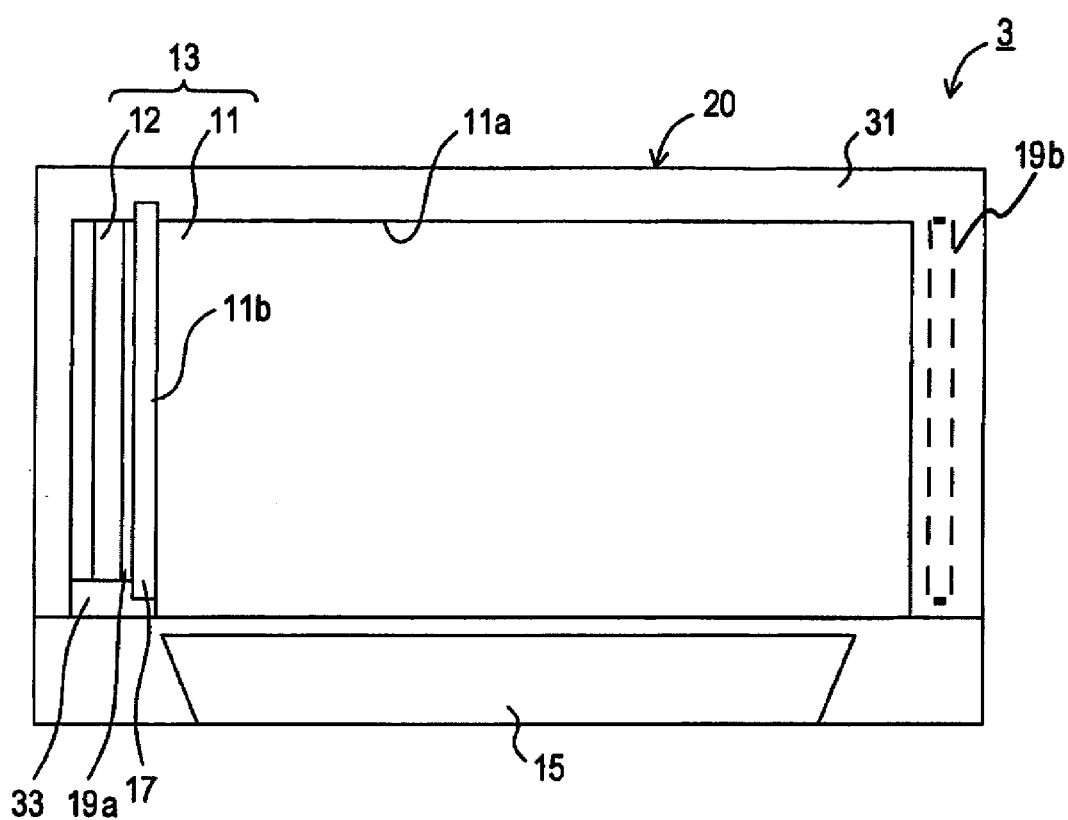
FIG. 2 is a plan view showing a main body of the image reading apparatus.

As shown in FIGS. 1A and 1B, the main body 3 includes an operation unit 15 including various switches on a front side thereof. The operation unit 15 allows a user to input various instructions to the image reading apparatus 1. The image reading apparatus 1 executes processing responsive to the instructions input by the user through the operation unit 15. Further, as shown in FIG. 2, a margin 11a of the first read surface 11 on a side close to a hinge of the FB cover 5 (a boundary with a frame body 31, which will be described later) and a margin 11b of the first read surface 11 on a side close to the second read surface 12 (a boundary with a positioning member 17, which will be described later) form sheet reference positions are used as a placement reference position for placing a sheet P (see FIG. 3B). The main body 3 forms a part of the image reading apparatus 1.

Referring to FIGS. 3A and 3B, the main body 3 includes a platen glass 13 (one example of a sheet table), a cabinet 20, the positioning member 17, a white reference member 19a, a black reference member 18b, a reading device 21 and an FB motor 23. The platen glass 13 forms the first read surface 11 (one example of a sheet table and a placement surface) and the second read surface 12 (one example of a sheet table and a placement surface). The cabinet 20 supports the platen glass 13. The positioning member 17 positions the sheet P placed on the first read surface 11. The FB motor 23 and the belt mechanism unit 25 move the reading device 21 (which will be described later).

As shown in FIG. 2, a rear end part (i.e., upper side in FIG. 2) and a right end part (i.e., right side in FIG. 2) of the platen glass 13 supported by a glass support part (not shown) from below. The rear end part and the right end part of the platen glass 13 are pushed from above to below by the frame body 31, which is extended from an upper margin of the cabinet 20 to a center of the cabinet 20 in substantially parallel with a bottom of the cabinet 20, and are fixed to the cabinet 20. The front left end part of the platen glass 13 (lower left side in FIG. 2) is pushed from above to below by a glass fixing part 33, which is extended from the margin of the front left end part of the frame body 31, and is fixed so as to not peel off from the cabinet 20.

The surface of the platen glass 13 is divided into the first read surface 11 and the second read surface 12 by the positioning member 17. The positioning member 17 is attachable to and detachable from the cabinet 20. The first read surface 11 is an area for reading the sheet P placed on the surface by the user. The first read surface 11 is provided in the right area of the image reading apparatus 1. The second read surface 12 is an area for reading the sheet P conveyed by a sheet conveyer 40. The sheet conveyer 40 is provided on the FB cover 5. The second read surface 12 is provided in the left area of the image reading apparatus 1.

The reading device 21 is housed in the cabinet 20 on the backs of the first and second read surfaces 11 and 12 (i.e., the back of the platen glass 13). The reading device 21 is moveable in the left-right direction (i.e., sub scanning direction). As shown in FIGS. 3A and 3B, the reading device 21 is fixed to a belt 25b wound around a pair of rollers 25a of the belt mechanism unit 25. In accordance with rotation of the belt 25b driven by the FB motor, the reading device 21 moves in the left-right direction of the image reading apparatus 1.

FIG. 3A is a schematic view showing a fix position of the reading device 21 when the sheet P is read while the sheet P is conveyed on the second read surface 12 using the sheet conveyer 40 provided on the FB cover 5. FIG. 3B is a schematic view showing a scanning mode of the reading device 21 in reading the sheet P placed on the first read surface 11.

When the sheet P conveyed on the second read surface 12 is read by the operation of the sheet conveyer 40, the reading device 21 is moved to a position under the second read surface 12 and is fixed. When reading the sheet P on the first read surface 11, the reading device 21 is moved in the left-right direction on the back of the first read surface 11 by the operation of the FB motor 23 and the belt mechanism unit 25.

As described above, the FB cover 5 includes the sheet conveyer 40. The sheet P placed on a sheet feed tray 41 is conveyed onto the second read surface 12, and the sheet P read by the reading device 21 on the second read surface 12 is discharged to a sheet discharge tray 42 as follows:

The sheet conveyer 40 includes sheet feed rollers 44 and 45 at the start point of the conveying path. The sheet P placed on the sheet feed tray 41 is conveyed downstream of the conveying path by the sheet feed rollers 44 and 45. The sheet P conveyed by the sheet feed rollers 44 and 45 is conveyed further downstream of the conveying path by conveying rollers 47 and 48.

An upper plate 49 is provided downstream of the conveying path of the conveying rollers 47 and 48. The upper plate 49 is opposed to the second read surface 12 with a predetermined gap therebetween. A pair of conveying rollers 51 and 52 is provided on the conveying path downstream of the upper plate 49. A pair of conveying rollers 53 and 54 is provided on the conveying path downstream of the pair of conveying rollers 51 and 52. The sheet P conveyed by the conveying rollers 47 and 48 passes through a nip between the upper plate 49 and the second read surface 12. The sheet P is then conveyed by the pair of conveying rollers 51 and 52 and is subsequently discharged to the sheet discharge tray 42 by the pair of sheet discharge rollers 53 and 54.

Figure 4A:
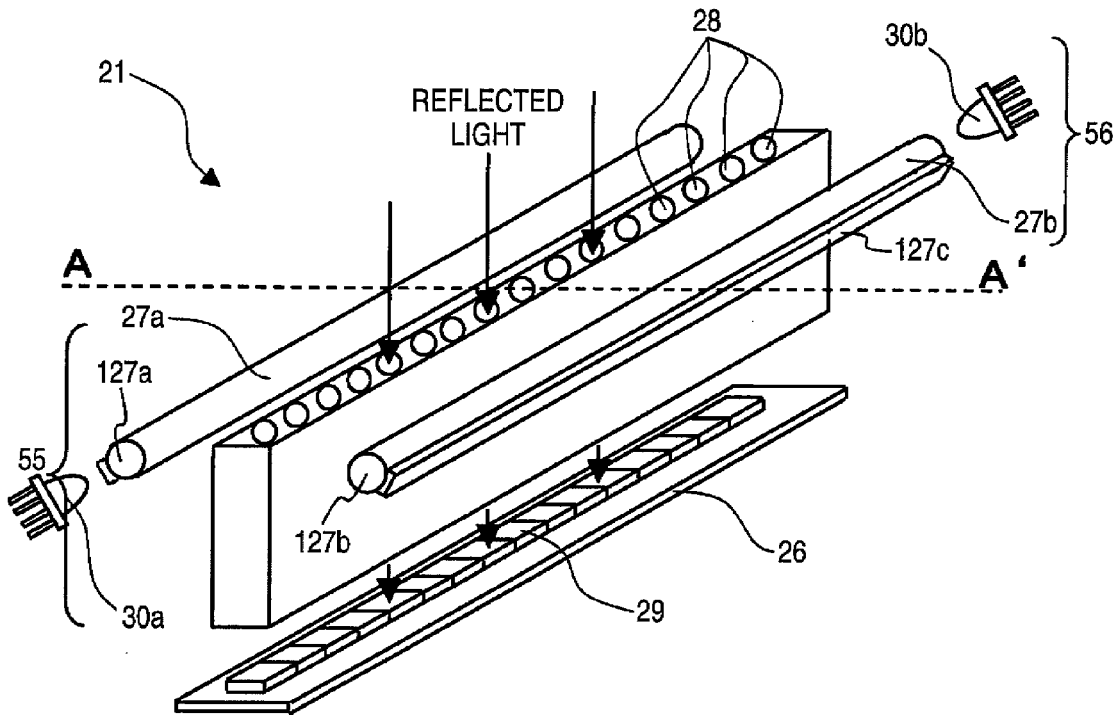
FIG. 4A shows a reading device of the image reading apparatus.
Figure 4B:
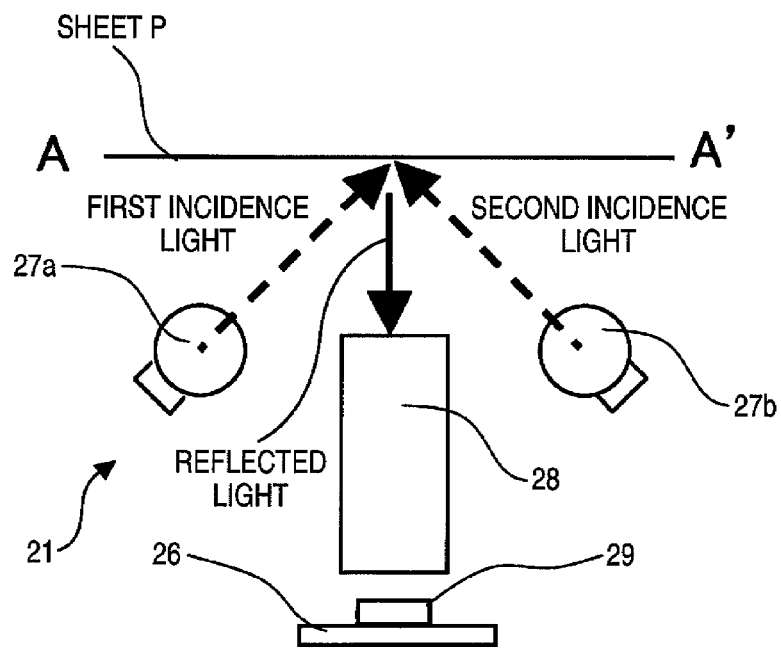
FIG. 4B is a sectional view taken on line A-A' in FIG. 4A.

Referring to FIGS. 4A and 4B, the reading device 21 includes lenses 28, a base plate 26, light receiving elements 29, a pair of light guide members 27a and 27b and LED lamps 30a and 30b. The light receiving elements 29 are formed on the base plate 26. The light receiving elements 29 detect light collected by the lenses 28. Incidentally, the lenses 28, the base plate 26 and the light receiving elements 29 form one example of a light receiving unit). The pair of light guide members 27a and 27b has a cylinder shape and is provided on both sides of the lenses 28 along an array direction of the lenses 28. The LED lamps 30a and 30b are placed on the light guide members 27a and 27b, respectively. The light guide member 27a and the LED lamp 30a form a first light source unit 55. The light guide member 27b and the LED lamp 30b form a second light source unit 56. The first light source unit 55 and the second light source unit 56 are one example of a light emitting unit).

In the second light source unit 56, an end face of the light guide member 27b where the LED lamp 30b is provided is an incidence face, on which light emitted from the LED lamp 30b is incident. An end face of the light guide member 27b where the LED lamp 30b is not provided is a reflection face 127b that prevents emission of light by reflecting the incident light. In the first light source unit 55, and end face of the light guide member 27a where the LED lamp 30a is provided is an incidence face 127a, on which light is incident, and a face opposite to the incidence face 127a is a reflection face.

The light guide member 27b includes a refection area 127c for reflecting and scattering light propagating in the light guide member 27b and taking out the light to the outside of the light guide member 27b.

In the second light source unit 56, the light emitted from the LED lamp 30b and incident on the inside of the light guide member 27b from the incidence face of the light guide member 27b is repeatedly reflected on the inner face of the light guide member 27b. The light propagates in the light guide member 27b, arrives at the reflection face 127b, is again reflected thereon and propagates in the light guide member 27b. When light is incident on the reflection area 127c after repeating the reflection of the light, the light is reflected on the reflection area 127c and is then emitted to the outside through an emission face, which is opposite to the refection area 127c, and the light is applied to a sheet P linearly. Incidentally, as for the first light source unit 55 including the LED lamp 30a and the light guide member 27a, the light is propagated as with the second light source unit 56.

The light guide member 27a and the LED lamp 30a of the first light source unit 55 have a similar structure as those of the second light source unit 56. The light emitted from the LED lamp 30a and incident on the inside of the light guide member 27a is applied to the sheet P linearly as with the second light source unit 56.

The lenses 28 and the light receiving elements 29 are placed in a row along the main scanning direction over substantially the same length as the length of the platen glass 13 in the back and forth direction thereof. Thus, first incidence light and second incidence light from the light guide members 27a and 27b, respectively, are applied to the sheet P. The light receiving elements 29 detects the reflected light from the sheet P, as shown in FIG. 4B.

Figure 5A:
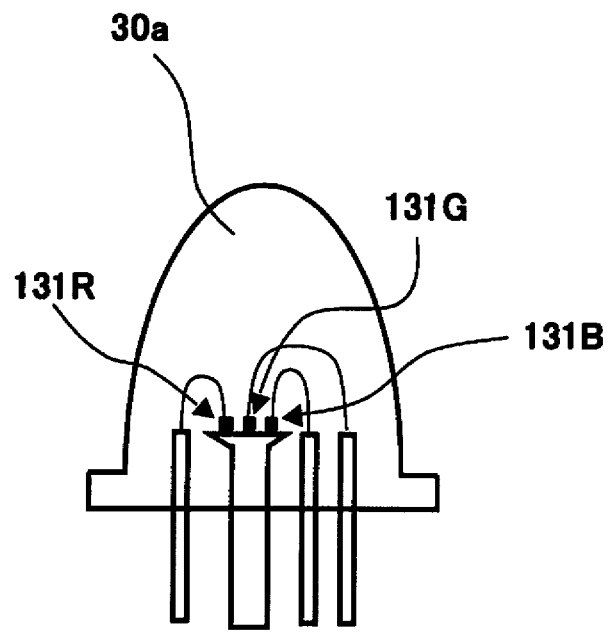
FIGS. 5A and 5B each shows a structure of LED lamp shown in FIG. 4.
Figure 5B:
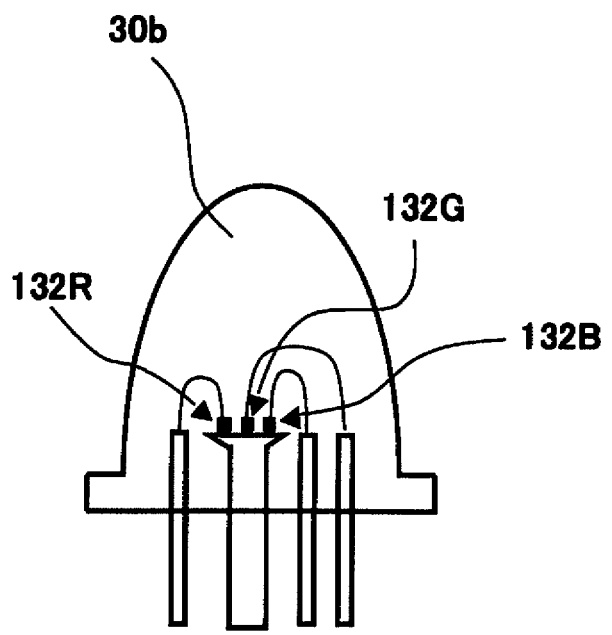

As shown in FIGS. 5A and 5B, the LED lamp 30a is formed by bonding a red (R) LED chip 131R, a green (G) LED chip 131G and a blue LED chip 131B of the first light source unit 55, those light emission wavelength are different from one another, on a metal lead. Then, the red LED chip 131R, green LED chip 131G, blue LED chip 131B and the metal lead are sealed with a transparent resin so as to have a lens shape.

Like the LED lamp 30a of the first light source unit 55, the LED lamp 30b of the second light source unit 56 is also formed by bonding a red (R) LED chip 132R, a green (G) LED chip 132G and a blue LED chip 132B of the first light source unit 55, those light emission wavelength are different from one another, on a metal lead, and by sealing the red (R) LED chip 132R, green (G) LED chip 132G, blue LED chip 132B and the metal lead with the transparent resin so as to have the lens shape.

Preferably, the LED chips 131R, 131G and 131B of the light sources of the first light source unit 55 and the LED chips 132R, 132G and 132B of the light sources of the second light source unit 56 have the same light emission wavelength. That is, the LED chip 131R of the first light source unit 55 and the LED chip 132R of the second light source unit 56, the LED chip 131G of the first light source unit 55 and the LED chip 132G of the second light source unit 56, and the LED chip 131B of the first light source unit 55 and the LED chip 132B of the second light source unit 56 preferably have substantially the same luminous efficiency.

According to the reading device 21, a first timing signal and a second timing signal generated by a light emission timing signal generation unit 107 (which will be described later) are input to the first light source unit 55 and the second light source unit 56, respectively. Either or both of the LED lamp 30a and the LED lamp 30b emit the light to the sheet P linearly. Accordingly, the reflected light by the sheet P forms an image on the light receiving elements 29 on the base plate 26 through the lenses 28. The formed analog read image is converted into digital read image information (hereinafter referred to as "read image information") by an AD converter 109 in FIG. 6.

As shown in FIG. 6, the image reading apparatus 1 includes a CPU 100, ROM 101, RAM 102, non-volatile memory (NVRAM) 103, a clock generator 104 (one example of pulse signal output unit), a PWM signal generation unit 105, an image processing unit 106, a light emission timing signal generation unit 107, a motor drive unit 108, a bus 57 for connecting the components, an AD converter 109 (one example of a read image conversion unit), the reading device 21 and LED circuits 113 and 114. Incidentally, the CPU 100 is one example of a light emission control unit, a first light emission parameter determination unit, a second light emission parameter determination unit, a first light source control unit, a first current value adjustment unit, a second light source control unit, a second current value adjustment unit and a current determination unit.

The ROM 101 stores various control programs, various settings, initial values, etc., for controlling the image reading apparatus 1. The RAM 102 is used as a work area for reading out the various control programs or a storage area for temporarily storing image data.

The CPU 100 controls the clock generator 104, the PWM signal generation unit 105, the image processing unit 106, the light emission timing signal generation unit 107 and the motor drive unit 108 connected by the bus 57 while storing the processing result in the RAM 102 or the NVRAM 103 in accordance with the control program read from the ROM 101.

The clock generator 104 generates a reference clock (CLK) for operating the image reading apparatus 1, etc., and a read start pulse (SP) (one example of a pulse signal) of a one line cycle based on the reference clock. The clock generator 104 transmits the reference clock (CLK) and the read start pulse (SP) to the reading device 21. Incidentally, although not shown in FIG. 6, the reference clock (CLK) is also input to the motor drive unit 108 and is used as the reference for moving the reading device 21. The one line cycle of the read start pulse is determined as a period of one line as the minimum unit for converting the analog read image into the read image information by the AD converter 109 of read image conversion unit. The one line cycle determines the read speed of the image reading apparatus 1.

The Pulse Width Modulation (PWM) signal generation unit 105 generates a Pulse Width Modulation (PWM) signal. The PWM signal generation unit 105 inputs drive current values of the first light source unit 55 and the second light source unit 56 to the LED circuit 113 and the LED circuit 114, respectively, as a first PWM signal and a second PWM signal.

As shown in FIG. 7A, the LED circuit 113 includes a current adjustment circuit 110 (one example of a drive current supply unit), the LED chips 131R, 131G and 131B, and NPN control transistors 231R, 231G and 231B. The first PWM signal is input to the current adjustment circuit 110. The LED chips 131R, 131G and 131B included in the LED lamp 30a of the first light source unit 55 each has an anode connected to the current adjustment circuit 110. The NPN control transistor 231R has a collector connected to a cathode of the LED chip 131R. The NPN control transistor 231G has a collector connected to a cathode of the LED chip 131G. The NPN control transistor 231B has a collector connected to a cathode of the LED chip 131B. The current adjustment circuit 110 is connected to a power supply of +12V and a ground (GND). An ON/OFF signal as a first timing signal from the light emission timing signal generation unit 107 is input to a base of each of the control transistors 231R, 231G and 231B. An emitter of each of the control transistors 231R, 231G and 231B is connected to the ground.

The current adjustment circuit 110, to which the first PWM signal is input, generates a constant current based on the first PWM signal to supply the constant current to each of the LED chips 131R, 131G and 131B as a drive current. The CPU 100 adjusts the first PWM signal by the PWM signal generation unit 105 so as to adjust the drive current of the first light source unit 55.

When an ON signal is input to the base of the control transistor 231R, the control transistor 231R is turned on. At this time, the drive current from the current adjustment circuit 110 flows into the LED chip 131R, and the LED chip 131R emits light. The LED chips 131G and 131B also emit light in a similar manner. Therefore, when the ON signal is input to the control transistor 231R, 231G or 231B, the corresponding LED chip 131R, 131G or 131B emits light. On the other hand, when an OFF signal is input to the control transistor 231R, 231G or 231B, the corresponding LED chip 131R, 131G or 131B does not emit light.

The electric configuration of the LED circuit 114 in FIG. 7B is the same as that of the LED circuit 113. That is, the LED circuit 114 includes a current adjustment circuit 111, to which the second PWM signal is input, the LED chips 132R, 132G and 132B and control transistors 232R, 232G and 232B. An ON/OFF signal as a second timing signal from the light emission timing signal generation unit 107 is input to a base of each of the control transistors 232R, 232G and 232B.

The current adjustment circuit 111 (one example of drive current supply unit), to which the second PWM signal is input, generates a constant current based on the second PWM signal and supplies the constant current to each of the LED chips 132R, 132G and 132B as a drive current. The CPU 100 adjusts the second PWM signal by the PWM signal generation unit 105 so as to adjust the drive current of the second light source unit 56. The CPU 100 can control a drive current supplied to the first light source unit 55 and a drive current supplied to the second light source unit 56 independently.

When the ON signal is input, the corresponding the LED chip 132R, 132G or 132B of the light sources of the second light source unit 56 emits light. On the other hand, when the OFF signal is input, the corresponding LED chip 132R, 132G and 132B does not emit light.

Referring again to FIG. 6, the light emission timing signal generation unit 107 outputs the ON signal to each light source of the first light source unit 55 and the second light source unit 56 during a necessary light emission time in one line cycle.

As described later, read image information for each one line cycle converted by the AD converter 109 is read image information dissolved for each color (R, G, B). Thus, the image processing unit 106 performs processing of collecting three colors into color one-line read image information.

The motor drive unit 108 moves the reading device 21 in the sub scanning direction by driving the FB motor 23 based on the reference clock (CLK).

(Timing Chart of Light Sources)

Figure 8:
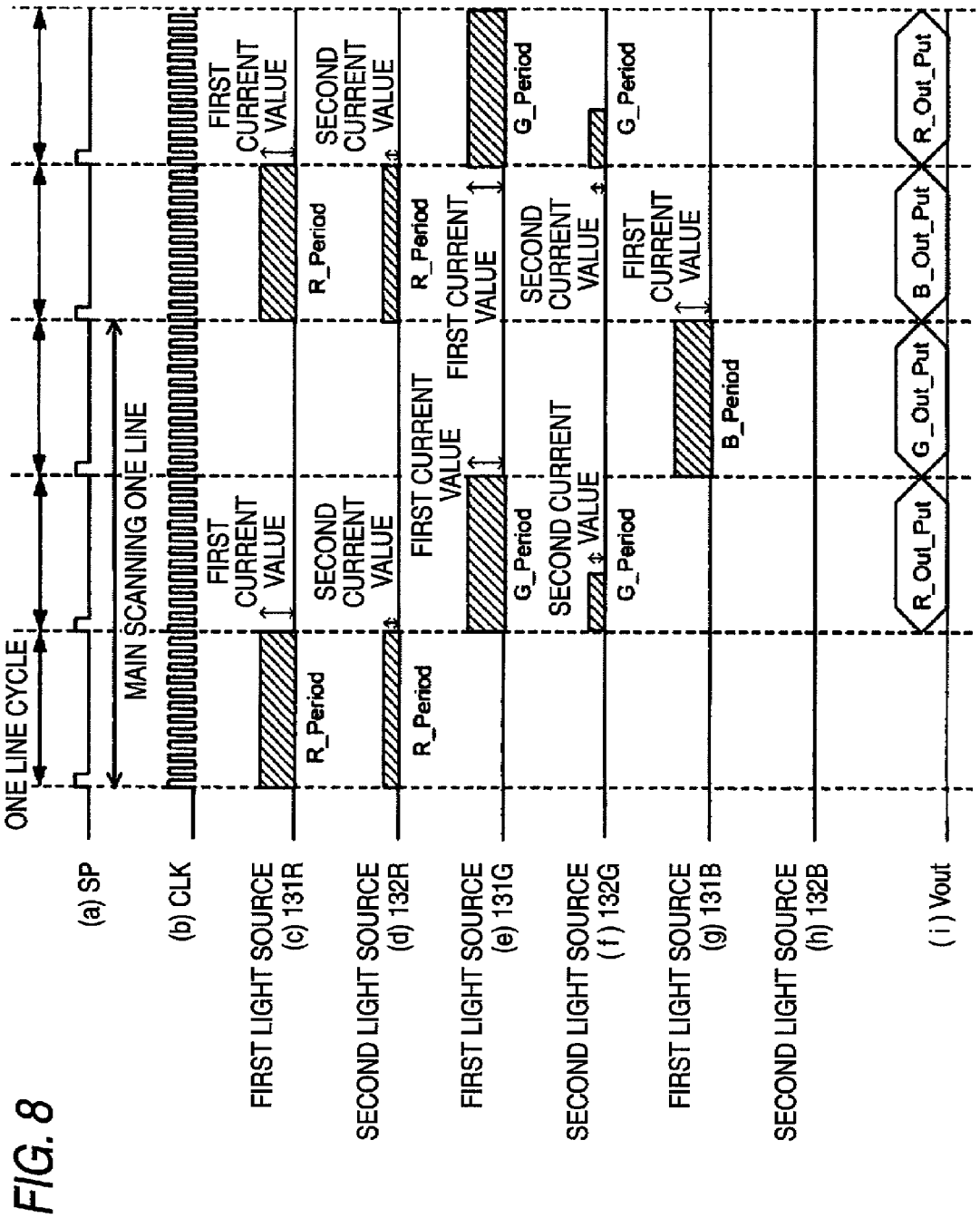
FIG. 8 is a timing chart showing a read operation of the image reading apparatus.

FIG. 8 shows a timing chart to indicate how the light sources of the first light source unit 55 and the second light source unit 56 are made to emit light when the reading device 21 reads a sheet P.

Item (a) of FIG. 8 shows a read start pulse (SP). The read start pulse (SP) is output for each one line cycle. Item (b) of FIG. 8 shows a reference clock (CLK).

Item (c) of FIG. 8 shows a timing chart of the red LED 131R of the first light source unit 55, in which a vertical axis indicates the drive current value (in the figure, first current value) of the first light source unit 55 required for causing the LED chip 131R to emit light and the LED chip 131R emits light at the timing of the hatched area. Such an explanation of the timing chart is also applied to the LED chip 131G in item (e) and the LED chip 131B in item (g) of FIG. 8.

Item (d) of FIG. 8 shows a timing chart of the red LED 132R of the second light source unit 56, in which a vertical axis indicates the drive current value (in the figure, second current value) of the second light source unit 56 required for causing the LED chip 132R to emit light and the LED chip 132R emits light at the timing of the hatched area. Such an explanation of the timing chart is also applied to the LED chip 132G in item (f) and the LED chip 132B in item (h) of FIG. 8.

When the reading device 21 reads the sheet P, the CPU 100 functioning as the light emission control unit switches one light source of the same light of the first light source unit 55 and the second light source unit 56 (i.e., the red LEDs 131R and 132R, the green LEDs 131G and 132G, and the blue LEDs 131B and 132B) to another light source of the same light of the first light source unit 55 and the second light source unit 56 in sequence for each one line cycle, as shown in FIG. 8.

At the time, the CPU 100 instructs the current adjustment circuits 110 and 111 to supply the drive current determined by performing processing with reference to FIG. 9 (S2 and S3) (which will be described later) to the first light source unit 55 and the second light source unit 56. The CPU 100 also outputs the ON signal from the light emission timing signal generation unit 107 outputs the ON signal to the light sources of the same color of the first light source unit 55 and the second light source unit 56 through the LED circuits 113 and 114 during the necessary light emission time in one line cycle determined by performing processing with reference to FIG. 9 (S2, S3 and S4) (which will be described later) in order to control light emission of the first light source unit 55 and the second light source unit 56.

Incidentally, when the reading device 21 reads the sheet P, the reading device 21 moves in the sub scanning direction based on the reference clock signal (CLK).

Figure 9:
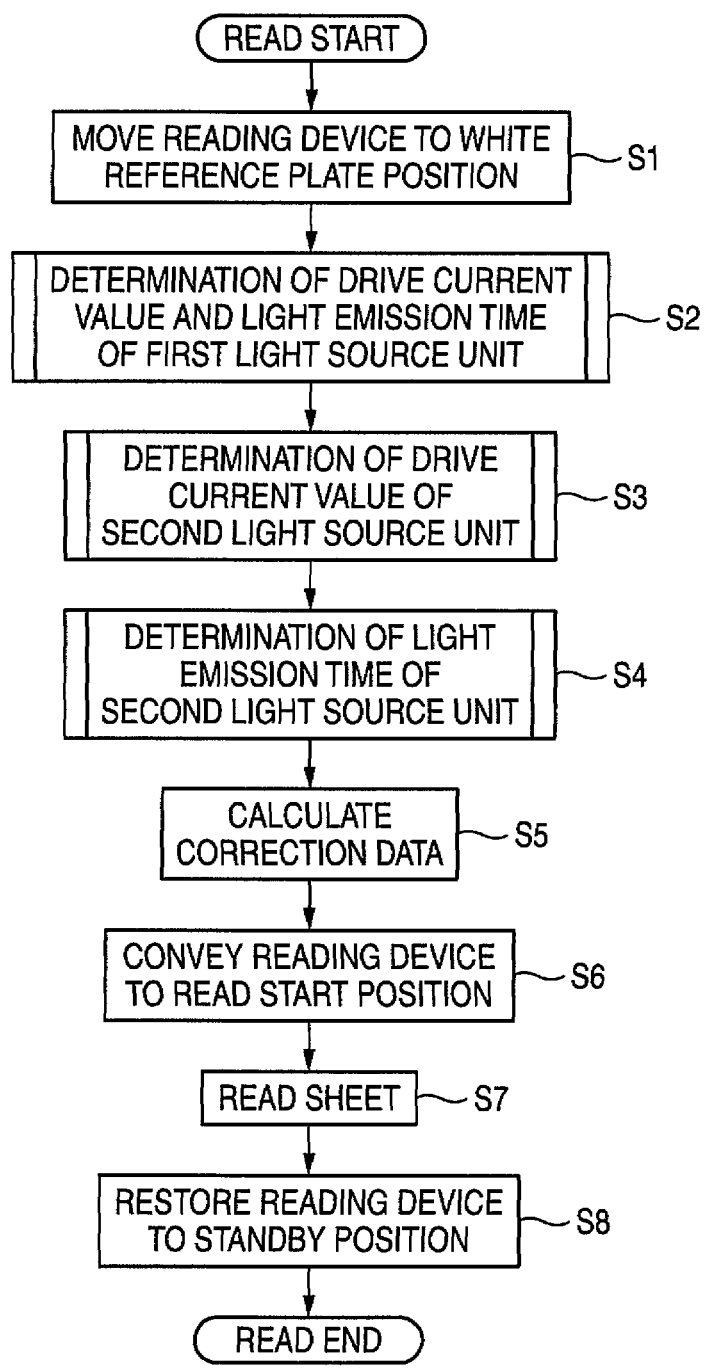
FIG. 9 is a flowchart showing a main routine of the image reading apparatus for reading an image on a sheet.

The CPU 100 functioning as the light emission control unit controls the first light source unit 55 and the second light source unit 56, which emit light at the timing shown as the hatched area in FIG. 8, so that the light sources of the same color emit light in sequence based on the drive current value of each light source unit and the light emission time of each light source of each light source unit, which are determined by performing the processing with reference to FIG. 9 (S2, S3 and S4) (which will be described later).

The light of the color of the light sources emitted in one line cycle from the first light source unit 55 and the second light source unit 56 at each of the timings in items (c) to (h) of FIG. 8 is stored by the light receiving elements 29. As shown in item (i) of FIG. 8, the light is transferred to the AD converter 109 with the read start pulse in the next period to the period emitting the light of the color and is converted by the AD converter 109 to form read image information for each one line cycle (R_Out_Put, G_Out_Put, B_Out_Put).

The read image information for each one line cycle is read image information dissolved for each color (R, G, B). Thus, the image processing unit 106 performs processing of collecting the read image information for each one line cycle converted by the AD converter 109 of three colors (i.e. three pieces of read image information of R_Out_Put, G_Out_Put and B_Out_Put) into color one-line read image information.

Referring to FIG. 9, when the sheet P placed on the first read 11 is read, first at S1 (step 1), the motor drive unit 108 drives the FB motor 23 in order to move the reading device 21 to an opposed position to the white reference member 19*a* (hereinafter, which will be also referred to as a white member position).

(Determination Processing of Drive Current Value and Light Emission Time of First Light Source Unit)

Figure 10:
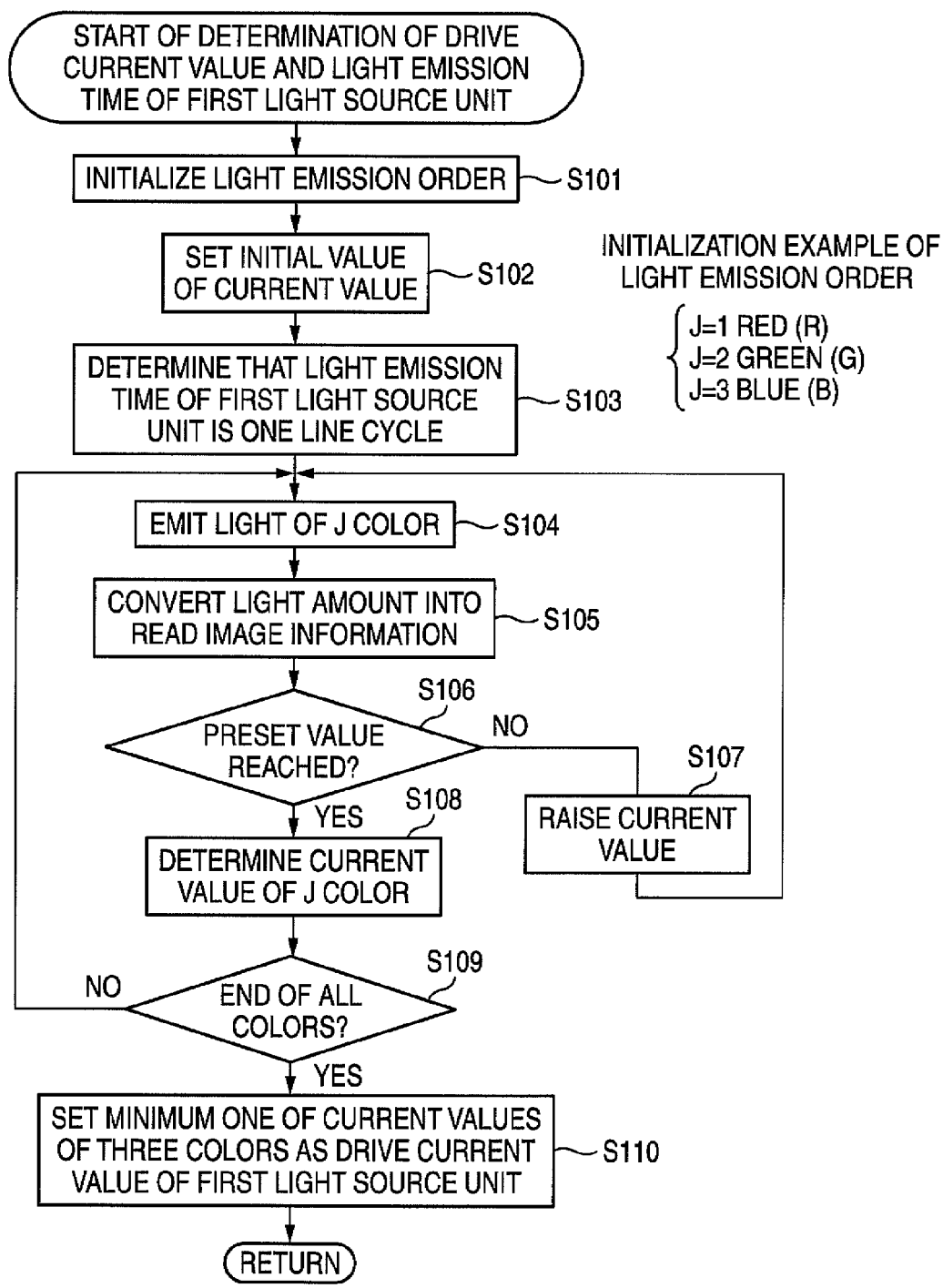
FIG. 10 is a flowchart showing a process of determining a drive current value and a light emission time of a first light source unit.

Referring to FIG. 10, determination processing of the drive current value and the light emission time of the first light source unit 55 at S2 (one example of a first light emission parameter determination unit) will be described.

At S101, the CPU 100 determines the light emission order of the LED chips 131R, 131G and 131B of the light sources of the first light source unit 55. For example, the following processing is performed in the order of red (R), green (G) and blue (B):

The CPU 100 sets zero as the initial value of the current value for driving the red LED chip 131R of the first light source unit 55 (S102). The initial values for the green LED chip 131B and the blue LED chip 131G are also set in a similar manner.

The CPU 100 uniformly determines that the light emission time in a one line cycle of each of the light sources of the first light source unit 55 is one line cycle (S103). The fact that the light emission time of each of the light source LED chips 131R, 131G and 131B is determined as one line cycle is stored in the RAM 102.

That is, the light emission time of each of the LED chips 131R, 131G and 131B of the first light source unit 55 is determined so that light is emitted throughout the one line cycle as shown in items (c), (e) and (g) of FIG. 8.

At S104, the CPU 100 functioning as the first light source control unit controls the first light source unit 55 to emit light throughout the one line cycle for each light source of the first light source unit 55 (for each of LED chips 131R, 131G and 131B). That is, the CPU 100 inputs the setup current value (first, the initial value set at S102) to the current adjustment circuit 110 as a first PWM signal to cause the current adjustment circuit 110 to flow the current corresponding to the setup current value. In order to cause the red LED chip 131R to emit light, the CPU 100 instructs the light emission timing signal generation unit 107 to output the ON signal to the control transistor 231R and the OFF signal to other control transistors 231G and 231B during the one line cycle.

Accordingly, by outputting the ON signal to the control transistor 231R during the one line cycle by the light emission timing signal generation unit 107, the LED chip 131R emits light during the time of the one line cycle based on the current value set as the initial value.

When the LED chip 131R emits light during the one line cycle, light is applied from the first light source unit 55 and is reflected by the white reference member 19*a*. The reflected light from the white reference member 19*a* is received by the light receiving elements 29, and the AD converter 109 converts the light amount of the received light into digital read image information (hereinafter referred to as "read image information") (S105).

The CPU 100 functioning as the first current value adjustment unit determines whether or not the maximum value of the read image information converted by the AD converter 109 reaches a preset value of the white gray scale level (i.e., 255) (S106). If the maximum value of the read image information does not reach the preset value, assuming that the maximum value of the read image information converted by the AD converter 109 is 120, the image reading apparatus 1 can represent color gray scale level (gradation) only from color gray scale level 0 (black) to 120. Thus, the light amount required for representing color gray scale level 0 (black) to 255 (white) becomes the light amount required for converting the light amount into the read image information during the one line cycle.

If the maximum value of the read image information converted by the AD converter 109 does not reach the preset value (i.e., 255), the CPU 100 functioning as the first current value adjustment unit raises the current value of the first light source unit 55 at a constant rate through the PWM signal generation unit 105 so that the light amount becomes the light amount required for converting the light amount into read image information during the one line cycle (S107).

The process returns to S104. The LED chip 131R is caused to emit light during the time of the one line cycle based on the current value raised at S107. At S105, the AD converter 109 converts the light amount of the received light into digital read image information. The processing at S104 to S107 is repeated until the maximum value of the converted read image information reaches the preset value (i.e., 255) (YES at S106).

When the maximum value of the converted read image information reaches the preset value (i.e., 255) (YES at S106), it is determined that the current value adjusted at S106 and S107 is the current value of the LED chip 131R (S108).

Next, at S109, if the processing at S104 to S108 for each of the sources of the first light source unit 55 is not completed (NO at S109), the process returns to S102. Processing similar to that for the LED chip 131R is also executed for the LED chips 131G and 131B.

If the processing at S104 to S108 for each of the sources of the first light source unit 55 is completed (YES at S109), the process goes to S110. The CPU 100 functioning as the first light emission parameter control unit determines that the minimum one of the current values of the LED chips 131R, 131G and 131B determined at S108 is the drive current value of the first light source unit 55. The CPU 100 stores the color of the light source with the minimum current value and the determined drive current value of the first light source unit 55 in the RAM 102 (S110).

In the exemplary embodiment, it is assumed that the current value of the blue LED chip 131B is the minimum among the current values of the LED chips 131R, 131G and 131B. At the time, it is assumed that the fact that the current value of the LED chip 131B is the drive current value of the first light source unit 55 and that the color of the light source with the minimum current value is blue is stored in the RAM 102.

The current value of the vertical axis in items (c), (e) and (g) of FIG. 8 is the same current value and indicates the drive current value of the first light source unit 55 (in the figure, first current value).

(Determination Processing of Drive Current Value of Second Light Source Unit)

Referring again to FIG. 9, upon completion of the determination processing of the drive current value and the light emission time of the first light source unit 55 at S2, the process goes to determination processing of the drive current value of the second light source unit 56 at S3. The processing at S3 will be described with the flowchart of FIG. 11.

At S201, the CPU 100 determines the light emission order of the LED chips 132R, 132G and 132B of the light sources of the second light source unit 56. In the exemplary embodiment, the following processing (S202 to S205) is performed in the order of red (R), green (G) and blue (B):

The CPU 100 determines whether or not Jth color (in the exemplary embodiment, J=1, 2, 3) in the light emission order is the color of the light source with the minimum current value stored in the RAM 102 at S110 in FIG. 9. The "color set in the first light source unit" means the color of the light source with the minimum current value stored in the RAM 102 at S110 in FIG. 9.

If the Jth color is not the color set in the first light source unit 55 (NO at S202), the process goes to S206 and performs processing (S206 to S212). In contrast, if the Jth color is the color set in the first light source unit 55 (YES at S202), the process goes to S203 and performs processing (S203 and S204). If predetermined processing of all colors is completed (YES at S205), the process goes to S213. In contrast, if predetermined processing of all colors is not completed, the process returns to S202.

In the exemplary embodiment, the color of the light source with the minimum current value is blue. When predetermined processing with J=1 and 2 is completed and the order of blue with J=3 comes, the determination at S202 is YES. The CPU 100 functioning as the second light emission parameter determination unit determines that the current value of the LED chip 132B is zero (S203) and that the light emission time of the LED chip 132B is zero. The CPU 100 stores these determination results, in which the current value of the LED chip 132B is zero and the light emission time of the LED chip 132B is zero, in the RAM 102 (S204).

The drive current value of the first light source unit 55 is based on the current value of the LED chip 132B, which is adjusted so that the light amount becomes the light amount required for converting the light amount into read image information during the one line cycle when light is emitted throughout the one line cycle. Therefore, in the LED chip 132B of the second light source unit 56, light need not be emitted. Consequently, the CPU 100 determines that the light emission time of the LED chip 132B is zero, and stores the fact that the light emission time of the LED chip 132B is zero in the RAM 102. Then, the process goes to S205.

For these reasons, the LED chip 132B of the light source of the second light source unit 56 does not have light emission timing (hatched area) in the item (h) of FIG. 8.

If the Jth color is not the color set in the first light source unit 55 (NO at S202), the process goes to S206 if the color is red (J=1) or green (J=2) in the exemplary embodiment. The CPU 100 sets zero as the initial value of the current value for driving the red LED chip 132R of the second light source unit 56 (S206). The initial value is also set in a similar manner for the green LED chip 132B.

At S207, the CPU 100 functioning as the second light emission parameter determination unit determines that the light emission time in one line cycle of each of the light sources of the second light source unit 56 is all the one line cycle.

At S208, the CPU 100 functioning as the second light source control unit controls the light sources of the same color of the first light source unit 55 and the second light source unit 56 (for example, the LED chips 131R and 132R) to emit light throughout the one line cycle.

At that time, the first light source unit 55 emits light using the drive current value of the first light source unit 55 determined at S110 in FIG. 10.

When the light sources of the same color of the first light source unit 55 and the second light source unit 56 emit light during the one line cycle, light is applied from both of the first light source unit 55 and the second light source unit 56, and the light is reflected by the white reference member 19a. The reflected light from the white reference member 19a is received by the light receiving elements 29 and the AD converter 109 converts the light amount of the received light into digital read image information (S209).

Next, the CPU 100 functioning as the second current value adjustment unit determines whether or not the maximum value of the converted read image information reaches the preset value of the white gray scale level (i.e., 255) (S210). The processing differs from the processing at S106 in FIG. 10 in that the first light source unit 55 is also caused to emit light at the same time.

According to the processing at S110 in FIG. 10, it is determined that the minimum current value of the adjusted current values of the three colors is the drive current value of the first light source unit 55. In the exemplary embodiment, as for the blue LED chip 131B of the first light source unit 55, the light amount is the light amount required for converting the light amount into read image information during the one line cycle. On the other hand, in the red LED chip 131R and the green LED chip 131G, the light amount is not the light amount required for converting the light amount into read image information during the one line cycle. Thus, additional light amount may also be supplied by emitting the light source of the second light source unit 56.

Therefore, for the colors except the color set at S110 in FIG. 10 (in the exemplary embodiment, for red and green except blue), if the maximum value of the converted read image information does not reach the preset value (i.e., 255) (NO at S210), the CPU 100 functioning as the second current value adjustment unit raises the current value of the light source of the J color of the second light source unit 56 in a constant rate so that the light amount becomes the light amount required for converting the light amount into read image information during the one line cycle.

Again, at S208, the light sources of the J color of the first light source unit 55 and the second light source unit 56 emit light during the time of the one line cycle based on the current value raised at S212. At S209, the AD converter 109 converts the light amount of the received light into digital read image information. The processing at S208, S209, S210 and S212 is repeated until the maximum value of the converted read image information reaches the preset value (i.e., 255) (YES at S210).

When the maximum value of the converted read image information reaches the preset value (i.e., 255) (YES at S210), it is determined that the current value adjusted at S210 and S212 is the current value of the J color of the second light source unit 56 (S211). In the exemplary embodiment, the current value of the LED chip 132R and the current value of the LED chip 132G are determined at S211.

When predetermined processing of all colors is completed (YES at S205), the process goes to S213. The CPU 100 functioning as the second current determination unit determines that the maximum one of the current values of the LED chips 132R, 132G and 132B is the drive current value of the second light source unit 56. The color of the light source with the maximum current value is stored in the RAM 102.

In the exemplary embodiment, it is assumed that the current value of the LED chip 132R is large as compared with the current value of the LED chip 132G. The current value of the LED chip 132B is determined zero at S203.

The CPU 100 functioning as the second light emission time determination unit determines that the light emission time of the light source set as the maximum one of the current values of the LED chips 132R, 132G and 132B is the whole of the one line cycle (S214).

In the exemplary embodiment, the light emission time of the LED chip 132R is set to the whole of the one line cycle as shown in the item (d) of FIG. 8. The processing in FIG. 11 now exits.

(Determination Processing of Light Emission Time of Second Light Source Unit)

Referring again to FIG. 9, upon completion of the determination processing of the drive current value of the second light source unit 56 at S3, the process goes to determination processing of the light emission time of the second light source unit 56 at S4. The processing at S4 will be described with a flowchart of FIG. 12.

At S301, the CPU 100 determines the light emission order of the LED chips 132R, 132G and 132B of the light sources of the second light source unit 56. In the exemplary embodiment, the following processing (S302 to S310) is performed in the order of red (R), green (G) and blue (B):

The CPU 100 accesses the RAM 102 and determines whether or not the light emission time of each of the light sources of the second light source unit 56 is stored (S302). That is, if the light emission time of each of the light sources of the second light source unit 56 is determined zero at S204 in FIG. 11 or is determined as one line cycle at S214 in FIG. 11 (YES at S302), since the light emission time of each of the light sources is already determined, the process goes to S310.

In the exemplary embodiment, the light emission time of the LED chip 132B is zero, and the light emission time of the LED chip 132R is one line cycle. Therefore, it is necessary to determine the light emission time of the green LED chip 132G of the remaining light source.

Next, if the light emission time of each of the light sources of the second light source unit 56 is not determined for color (NO at S302), the process goes to S303. At S303, the CPU 100 sets the drive current value determined at S212 in FIG. 11. A zero is set as the initial value of the light emission time of the J color of the second light source unit 56 (S304).

Next, at S305, the CPU 100 controls the light sources of the J color of the first light source unit 55 and the second light source unit 56 to emit light. Incidentally, the CPU 100 controls the light source of the J color of the first light source unit 55 to emit light over the one line cycle, and the CPU 100 controls the light source of the J color of the second light source unit 56 to emit light during the time of the initial value of the light emission time (zero).

Figure 11:
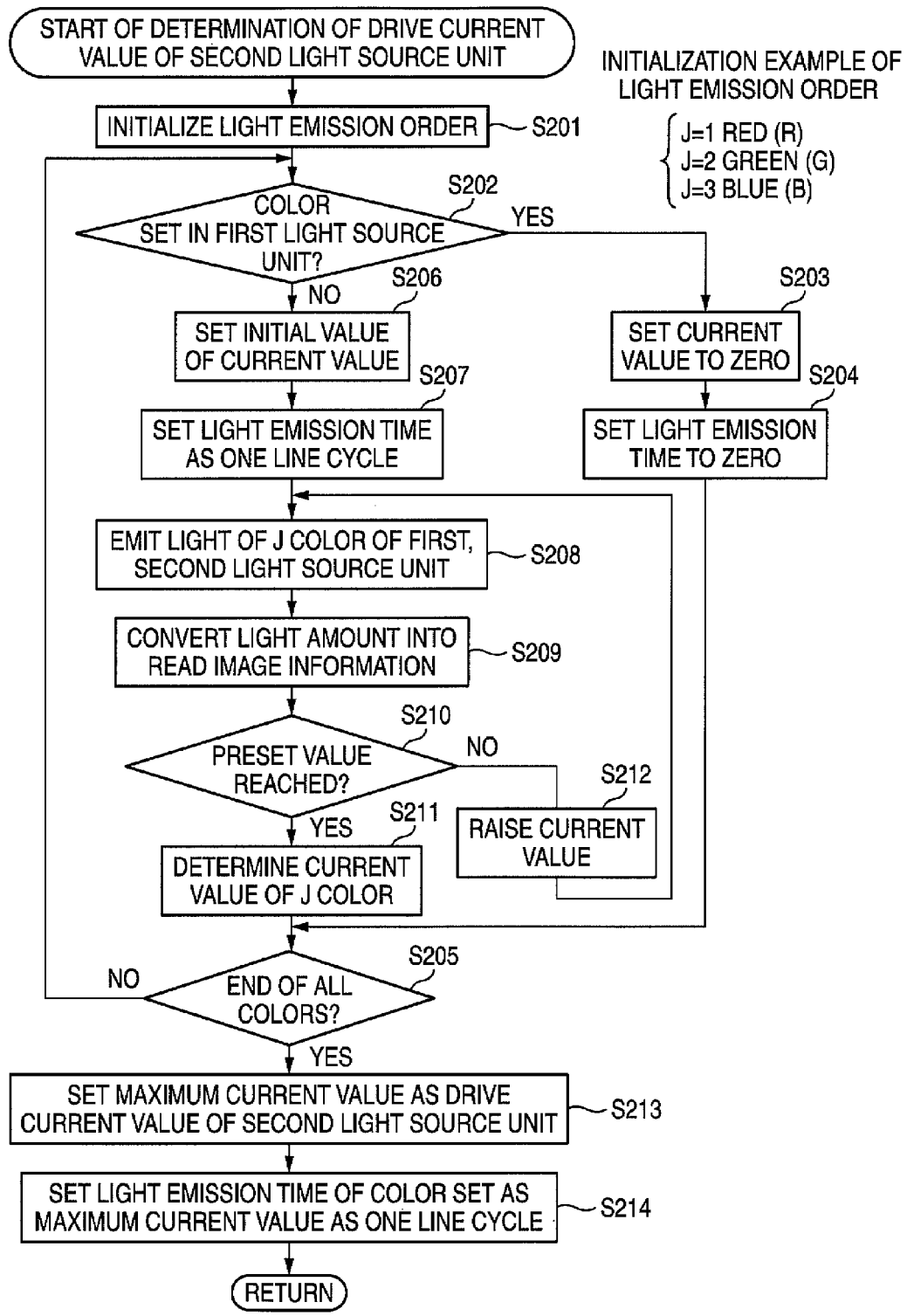
FIG. 11 is a flowchart showing a process of determining the drive current value of a second light source unit.

At that time, the CPU 100 controls the first light source unit 55 using the drive current value of the first light source unit 55 determined at S110 in FIG. 10, and the CPU 100 controls the second light source unit 56 using the drive current value of the second light source unit 56 determined at S212 in FIG. 11.

Next, when the light sources of the J color of the first light source unit 55 and the second light source unit 56 emit light during each light emission time described above, light is applied from both of the first light source unit 55 and the second light source unit 56, and the light is reflected by the white reference member 19a. The reflected light from the white reference member 19a is received by the light receiving elements 29, and the AD converter 109 converts the light amount of the received light into digital read image information (S306).

According to the processing at S212 in FIG. 11, the current value of the second light source unit 56 of the color with the maximum current value is determined the drive current value of the second light source unit 56. Thus, in the light source of another color of the second light source unit 56 (in the exemplary embodiment, green), if the light emission time is a one line cycle and the drive current value of the second light source unit 56 determined at S212 is used, the light amount becomes equal to or more than the light amount required for converting the light amount into read image information during the one line cycle. Thus, the light emission time of the light source of another color of the second light source unit 56 (in the exemplary embodiment, green) is adjusted so that the light amount becomes the light amount required for converting the light amount into read image information during the one line cycle.

Thus, if the maximum value of the converted read image information does not reach the preset value (i.e., 255) (NO at S307), the CPU 100 functioning as the second light emission time determination unit raises the light emission time of the light source of the J color of the second light source unit 56 in a constant rate so that the light amount becomes the light amount required for converting the light amount into read image information during the one line cycle (S309).

Again, at S305, the light source of the J color of the second light source unit 56 emits light during the light emission time raised at S309, and the light source of the J color of the first light source unit 55 is caused to emit light during the time of the one line cycle. At S306, the AD converter 109 converts the light amount of the received light into digital read image information. The processing at S305, S306, S307 and S309 is repeated until the maximum value of the converted read image information reaches the preset value (i.e., 255) (YES at S307).

At S308, the light emission time of the J color is determined. Incidentally, the LED chip 132G in the item (f) of FIG. 8 indicates the result of adjusting the light emission time according to the processing at S304, S305, S306 and S308 in the exemplary embodiment. As a result of the adjusting, the light emission time of the LED chip 132G becomes the light emission time of about a third of the one line cycle.

Figure 12:
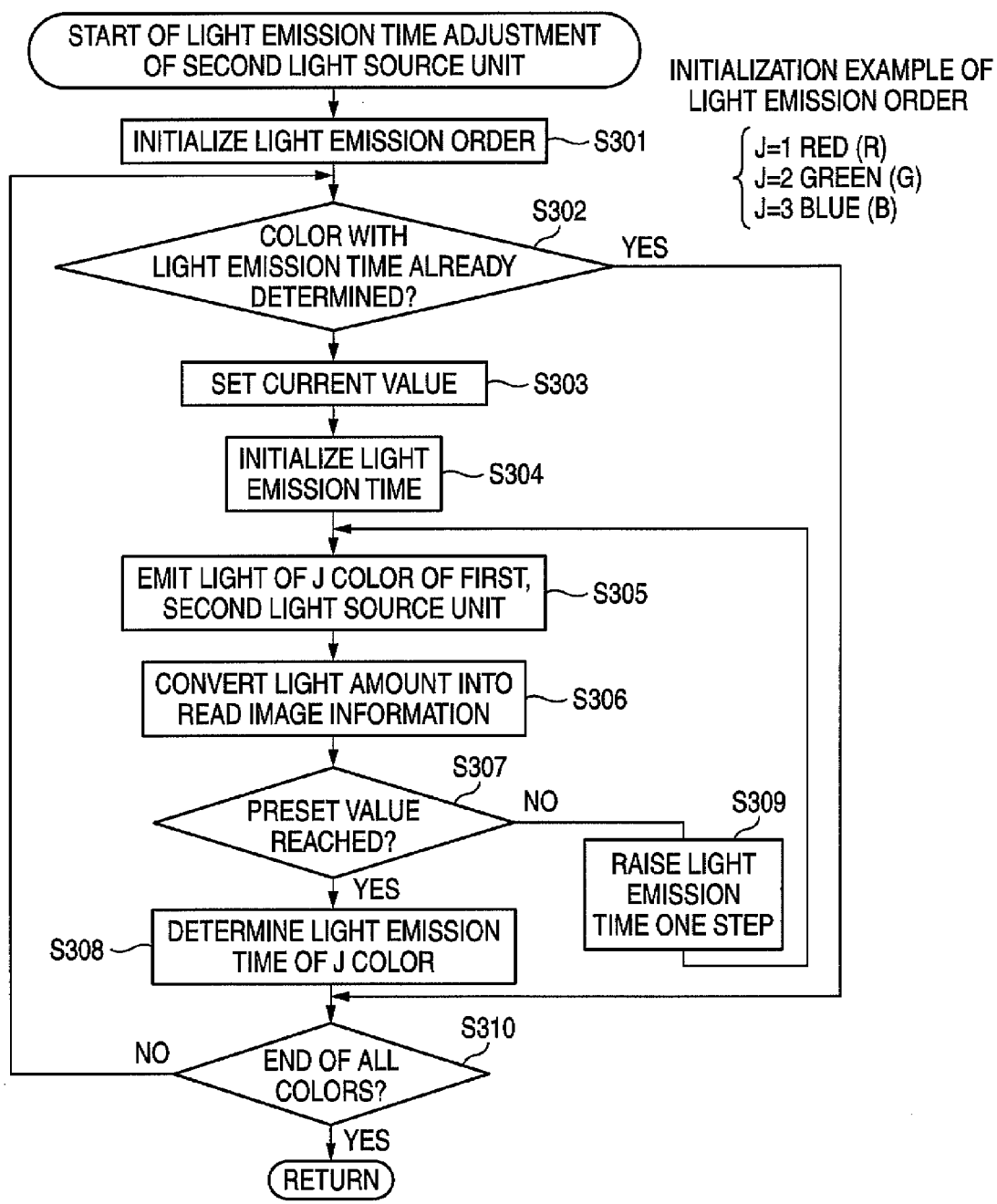
FIG. 12 is a flowchart showing a process of determining a light emission time of the second light source unit.

If processing of all colors is completed (YES at S310), the processing in FIG. 12 is completed.

(Sheet Read Processing)

Referring again to FIG. 9, at S5, the image reading apparatus 1 controls the first light source unit 55 and the second light source unit 56 to emit light based on the drive current values of the first light source unit 55 and the second light source unit 56 and the light emission times of the light sources, which are set in processing of S2 to S4, so as to read the white reference member 19a and generate a white reference value for shading correction. Then, the CPU 100 turns off the first light source unit 55 and the second light source unit 56 and controls the motor drive unit 108 to convey the reading device 21 to the black reference member 19b. Then, the CPU 100 controls the reading device 21 to read the black reference member 19b for generating a black reference value for shading correction.

At S6, the CPU 100 controls the motor drive unit 108 to convey the reading device 21 to the read start position.

At S7, the CPU 100 functioning as the light emission control the first light source unit 55 and the second light source unit 56, which emit light at the timings shown as the hatched areas in FIG. 8, so that the light sources of the same color emit light in sequence based on the drive current values of the light source units and the light emission times of the light sources of the light source units, which are determined in the processing of S2 to S4. The first light source unit 55 and the second light source unit 56 emit light based on the control of the CPU 100. At the time, the CPU 100 reads the sheet for each one line cycle while controlling the motor drive unit 108 to convey the reading device 21 at the read speed responsive to the read mode.

Upon completion of reading the sheet at S7, the reading device 21 is restored to a predetermined standby position. The sheet read is now completed.

In the above-described exemplary embodiment, the image reading apparatus 1 emits light throughout the one line cycle while switching the light sources of the first light source unit 55 as in the items (c), (e) and (g) of FIG. 8. Therefore, it is possible to prevent the light of the light sources from being extinct. Thus, it is possible to decrease factors such that a horizontal thin line of the sheet is not read and interference fringe (moire), etc., occurs because of the time when light of the light source is extinct.

In the above-described exemplary embodiment, in order to find the drive current value of the first light source unit 55, the image reading apparatus 1 controls each of the light sources of the first light source unit 55 to emit light, finds the current value of the light amount required for converting the light amount into read image information, and determines that the minimum drive current value is the drive current value of the first light source unit 55, as previously described with reference to FIG. 10. According thereto, the drive current value of the first light source unit 55 is determined, even if the characteristic of each of the light sources changes due to variation with time, the drive current value of the first light source unit can be determined appropriately.

In addition, the light emission time of each of the LED chips 131R and 132R extend throughout the one line cycle as in the items (c) and (d) of FIG. 8. Therefore, red can be read uniformly and efficiently.

Modification to Exemplary Embodiments

The above-described exemplary embodiment is for illustrative purposes only, and the exemplary embodiment does not limit the invention. Therefore, the invention can be embodied in various improvements, modifications, and deformations without departing from the spirit and the scope of the invention, of course.

For example, the invention can be applied to any image reading apparatus such as a printer, a copier, a scanner or a FAX if the device processes an image. The image forming system of the image forming unit is not limited to electrophotography and may be an inkjet system. The image reading apparatus may be able to form a color image or may be dedicated to a monochrome image.

The invention has been described using the first light source unit 55 and the second light source unit 56. As another exemplary embodiment, the first light source unit 55 is caused to emit light throughout the one line cycle while the light sources are switched, and using other light source units, the drive current value of each light source unit and the light emission time of each light source may be adjusted appropriately so that the light amount becomes the light amount required for converting the light amount into read image information.

In the above-described exemplary embodiment, each of the light sources of the first light source unit 55 is caused to emit light, the current value of the light amount required for converting the light amount into read image information is found, and it is determined that the minimum drive current value is the drive current value of the first light source unit, as described with reference to FIG. 10. Alternatively, if the color corresponding to the smallest light amount required for converting the light amount into read image information is previously known among the LED chips 131R, 131G and 131B of the first light source unit 55, processing shown in FIG. 10 may be performed only for the color and the current value may be adopted as the drive current value of the first light source unit 55. Further, if the color corresponding to the smallest light amount required for converting the light amount into read image information is previously known, the need for causing each of the light sources of the first light source unit 55 to emit light and finding the current value of the light amount required for converting the light amount into read image information is eliminated.

The LED chip 132G emits light from the beginning of the switched one line cycle as in the item (f) of FIG. 8. Alternatively, the CPU 100 may control so as to emit light based on the last of the switched one line cycle.

If the light source whose light emission time is set to zero is previously known in the second light source unit 56, the light source may be deleted from the components of the second light source unit 56. In this case, the cost can be reduced and the structure of the image reading apparatus can be simplified.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. An image reading apparatus comprising:
a sheet table comprising a placement surface on which a sheet is placed;
a light emitting device comprising a plurality of light sources, each of which emits different color light from one another;
a light emitting unit, which comprises a plurality of light emitting devices, and which emits light to the placement surface;
a light receiving unit that receives reflected light from the placement surface;
a read image conversion unit that converts the reflected light into read image information;
a pulse signal output unit that outputs a pulse signal of a period corresponding to a time for converting into the read image information of one line as a minimum unit for converting into the read image information by the read image conversion unit from the reflected light of each of the plurality of light sources;
a plurality of drive current supply units that supply drive currents, each of which is a constant current, to respective one of the plurality of light emitting devices;
a light emission control unit that is configured to:
control the light sources to emit the same color lights among the plurality of light emitting devices for each period,
switch the light sources from emitting first color lights by first color light sources to emitting second color lights by second color light sources among the plurality of light emitting devices for each period in sequence in synchronization with the pulse signal; and
control the second color light sources to emit the second color lights based on a current value determined for each of the plurality of light emitting devices and a light emission time for each of the plurality of light sources during the period;
a first light emission parameter determination unit that is configured to:
select a smallest light source, in which a light amount required for converting into the read image information is the smallest among the plurality of light sources, from the plurality of light sources;
control the smallest light source to emit light throughout the period;
determine the current value required for obtaining at least the required light amount based on the emit light by the smallest light source;
determine the determined current value as the drive current value of a first light emitting device having the smallest light source; and
determine the light emission time of each of the plurality of light sources of the first light emitting device for enabling each of the plurality of light sources of the first light emitting device to emit the light throughout the period; and
a second light emission parameter determination unit that determines a drive current value of a second light emitting device and the light emission time of each of the plurality of light sources of the second light emitting device such that a sum of a first light amount and a second light amount becomes the light amount required for converting into the read image information during the period, wherein:
the first light amount is a light amount of light emitted from each of the plurality of light sources of the first light emitting device in the drive current value determined by the first light emission parameter determination unit; and
the second light amount is a light amount of light, which is emitted from the light source of the second light emitting device and which is the same color as the light emitted from each of the plurality of light sources of the first light emitting device, received by the light receiving unit,
wherein the light emission control unit controls the plurality of light sources to emit the same color light in sequence based on the drive current value of each of the first light emitting device and the second light emitting device and the light emission time of each of the plurality of light sources determined by the first light emission parameter determination unit and the second light emission parameter determination unit.

2. The image reading apparatus according to claim 1,
wherein the first light emission parameter determination unit comprises:
a first light source control unit that controls each of the plurality of light sources of the first light emitting device to emit light throughout the period; and
a first current value adjustment unit that adjusts the current value for each of the plurality of light sources of the first light emitting device so as the light amount of reflected light received by the light receiving unit to become the light amount required for converting into the read image information when the first light source control unit controls the plurality of light sources of the first light emitting device to emit light, and
wherein the first light emission parameter determination unit determines a current value of a minimum light source, which current value is the minimum among the current values of the plurality of light sources adjusted by the first current value adjustment unit, as the drive current value of the first light emitting device.

3. The image reading apparatus according to claim 2,
wherein the light emitting unit comprises the first light emitting device and the second light emitting device,
wherein the second light emission parameter determination unit sets the light emission time of a first light source of the second light emitting device, which emits the same color light as that of the smallest light source, to zero, and
wherein the second light emission parameter determination unit comprises:
a second light source control unit that controls one light source of the first light emitting device and one light source of the second light emitting device, which emits the same color light as that of the first light source, throughout the period using the current value determined by the first light emission parameter determination unit;
a second current value adjustment unit which, based on light emission of the second light source control unit, adjusts current values of other light sources than the first light source of the second light emitting device such that a sum of a light amount of one of the plurality of light sources of the first light emitting device and a light amount of one of the plurality of light sources of the second light emitting device received by the light receiving unit becomes the light amount required for converting into the read image information;
a second current determination unit that determines a maximum light source, which current value is the maximum among the current values of the other light sources of the second light emitting device adjusted by the second current value adjustment unit, as the drive current value of the second light emitting device; and a second light emission time determination unit, which determines a light emission time of the maximum light source to emit light throughout the period, and which determines a light emission time of a remaining light source of the second light emitting device such that a sum of the a light amount of the remaining one light source and a light amount of one light source, which emits the same color light as that of the remaining one light source, of the first light emitting device becomes the light amount required for converting into the read image information.

4. An illuminator for use with image reading apparatus, the illuminator comprising:

a first light emitting unit for emitting first light;
a second light emitting unit for emitting second light;
a pulse signal generator that generates a pulse signal at constant interval; and
a controller that is coupled to:
  the first light emitting unit;
  the second light emitting unit; and
  the pulse signal generator,
wherein the controller is configured to control the first light emitting unit to:
  start emitting the first light upon receipt of a first pulse signal from the pulse signal generator; and
  stop emitting the first light upon receipt of a second pulse signal from the pulse signal generator, and
wherein the controller is configured to control the second light emitting unit to:
  start emitting the second light after the controller controls the first light emitting unit to start emitting the first light; and
  stop emitting the second light before the controller controls the first light emitting unit to stop emitting the first light.

5. The illuminator according to claim 4,
wherein the first light emitting unit comprises:
  a first red light source for emitting first red light;
  a first green light source for emitting first green light; and
  a first blue light source for emitting first blue light,
wherein the second light emitting unit comprises:
  a second red light source for emitting second red light;
  a second green light source for emitting second green light; and
  a second blue light source for emitting second blue light, and
wherein the controller controls the second light emitting unit to:
  emit the second red light when the first light emitting unit is emitting the first red light;
  emit the second green light when the first light emitting unit is emitting the first green light; and
  emit the second blue light when the first light emitting unit is emitting the first blue light.

6. The illuminator according to claim 4,
wherein the controller controls light intensity of the first light emitting unit and light intensity and emission time of the second light emitting unit such that a sum of a first light amount of the first light emitting unit and a second light amount of the second light emitting unit becomes a predetermined value,
wherein the first light amount is obtained by multiplying the light intensity of the first light emitting unit by one constant interval of the pulse signal, the one constant interval corresponding to emission time of the first light emitting unit, and
wherein the second light amount is obtained by multiplying the light intensity of the second light emitting unit by the emission time of the second light emitting unit.

* * * * *